US006737467B1

(12) United States Patent
Decker et al.

(10) Patent No.: US 6,737,467 B1
(45) Date of Patent: May 18, 2004

(54) LOW GLOSS POWDER COATINGS

(75) Inventors: Owen H. Decker, Spring, TX (US); M. Aaron Sparks, Houston, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/717,413

(22) Filed: Nov. 21, 2000

(51) Int. Cl.$^7$ .............. C08K 3/40; C08K 7/16; C08L 39/00; C08L 39/02; C08L 33/04; C08L 75/00; C08L 67/00; C08L 27/06

(52) U.S. Cl. .............. 524/494; 524/904; 524/551; 524/555; 524/556; 524/589; 523/220

(58) Field of Search .............. 524/494, 904, 524/551, 555, 556, 601, 605, 589, 582, 585; 523/220; 106/409, 482

(56) References Cited

U.S. PATENT DOCUMENTS

| 5,252,632 A | * 10/1993 | Savin .............. 523/137 |
| 5,665,505 A | * 9/1997 | Malhotra .............. 430/97 |
| 5,856,378 A | 1/1999 | Ring et al. |
| 6,017,640 A | * 1/2000 | Muthiah et al. .............. 428/514 |
| 6,093,407 A | 7/2000 | Cummings et al. |
| 6,093,774 A | * 7/2000 | Dumain .............. 525/207 |
| 6,190,787 B1 | * 2/2001 | Maeda et al. .............. 428/620 |
| 6,207,296 B1 | * 3/2001 | Higuchi et al. .............. 428/620 |
| 6,217,252 B1 | * 4/2001 | Tolliver et al. .............. 404/77 |
| 6,455,630 B1 | * 9/2002 | Rigosi et al. .............. 524/584 |
| 6,524,694 B1 | * 2/2003 | Phillips .............. 428/323 |

FOREIGN PATENT DOCUMENTS

| DE | 40 08 361 A | 10/1990 |
| GB | 2 231 334 A | 11/1990 |
| WO | WO 00/01774 | 1/2000 |
| WO | WO 00/15351 | 3/2000 |

OTHER PUBLICATIONS

Kroschwitz, Jacqueline I. (Editor); Encyclopedia of Polymer Science and Engineering, vol.9, John Wiley& Sons, New York, 1989 (pp. 788–795).*
PCT Search Report mailed on Sep. 23, 2002.

* cited by examiner

*Primary Examiner*—Callie Shosho
(74) *Attorney, Agent, or Firm*—Steven C. Benjamin

(57) ABSTRACT

Powder coating compositions containing 5 to 60 wt % of spherical or near spherical particles having a median diameter of greater than 10, and most preferably of greater than 15 microns exhibit lower gloss without undesirable side effects such as loss of coating flow or creation of an "orange peel" effect.

5 Claims, No Drawings

LOW GLOSS POWDER COATINGS

FIELD OF THE INVENTION

The invention relates to powder coatings in general and, more specifically, to powder coatings that provide a low gloss appearance to the coated article.

BACKGROUND OF THE INVENTION

Powder coatings are widely used to provide a decorative and/or protective coating on a substrates. They are becoming increasingly popular because they are applied in a solid state or slurry. These application states mean that the powder coatings use little or no solvents, unlike their conventional liquid coating counterparts. In addition, solid state application permits the powder to be collected, purified and re-used.

In certain applications, it is necessary or desirable for the powder coating to have a surface that is smooth in appearance, but has a low gloss or shine. Such applications are those where low gloss is aesthetically desired, or where glare from the coating surface can interfere with the safe or proper use of the coated article, such as firearms, optical devices, military applications and motor vehicles, aircraft and other vehicles. Prior art attempts to control gloss in powder coatings has taken three different approaches using fillers, waxes and differential cure.

The addition of fillers is known to reduce the gloss of powder coatings. Indeed, gloss reduction is an unavoidable, and often undesirable, side effect of filler addition. For example, the 3M Company markets ceramic microspheres under the trade name Zeeospheres™ for use in powder coatings to control gloss. A filler commonly used for gloss control is wollastonite, whose needle-shaped crystals are very effective at reducing gloss by reducing the microscopic smoothness of coatings. Fillers of other shapes are also commonly used to reduce gloss. The shortcoming of the use of fillers to control gloss is that their addition also reduces coating flow, typically increasing the amount of waviness or texture known as "orange peel."

Hydrocarbon and fluorocarbon waxes are used to reduce the gloss of powder coatings. As a wax-containing coating is baked, the wax migrates to the coating/air interface where it forms a layer with reduced gloss. Shortcomings of this approach are that the wax softens the coating surface and reduces its resistance to marring, staining and chemical attack.

Another way to reduce gloss, which is especially effective with epoxy and epoxy/polyester hybrid coatings, is to incorporate at least two curing agents or two differently structured or differently-catalyzed resins. Upon incomplete molecular mixing, such as is typically encountered in a powder coating extruder, these differential-cure systems result in the development of zones of varying shrinkage or varying surface tension on the coating surface during cure, yielding a microscopically-rough layer which is seen as low gloss.

Variations of this approach are widely used. A shortcoming of this approach is that coating properties such as impact resistance, flexibility, or chemical resistance suffer.

SUMMARY OF THE INVENTION

In one aspect, the invention provides an improved powder coating composition, the improvement wherein comprising the use in the composition of spheroidal particles having a mean particle size greater than 10 microns and preferably greater than 15 microns, and having a maximum particle size of about 50 microns.

In another embodiment, the invention provides a process of reducing gloss in a powder coating, the process comprising adding spheroidal particles to a powder coating composition, wherein said spheroidal particles have a mean particle size greater than 10 microns and preferably greater than 15 microns, and have a maximum particle size of about 50 microns.

These and other features of the invention will become apparent on a further reading of the application.

DETAILED DESCRIPTION OF THE EMBODIMENTS

The powder coatings of this invention provide the formulator with an opportunity to control the gloss of the final coating while minimizing or eliminating the negative effects of the prior art attempts at controlling gloss; i.e., loss of coating flow and creation of "orange peel" surface effects. It is important to note that the coatings of this invention have a rough or textured surface microscopically, but otherwise appear smooth to the naked eye.

The powder coating compositions of this invention contain one or more thermosetting or thermoplastic resins commonly used in such coatings and well known in the art. Such resins include those based on epoxy, polyester, acrylic and/or urethane resins. Examples of such resins include saturated and unsaturated polyesters, acrylics, acrylates, polyester-urethanes, acrylic-urethanes, epoxy, epoxy-polyester, polyester-acrylics and epoxy-acrylics. Useful thermoplastic resins may include nylon, polyvinylchloride, polyethylene, polyethylene terephthalate, polybutylene terphthalate and polypropylene, for example.

The powder coating compositions of this invention may be applied by electrostatic spray, thermal or flame spraying, or fluidized bed coating methods, all of which are known to those skilled in the art. The coatings may be applied to metallic and/or non-metallic substrates. Following deposition of the powder coating to the desired thickness, the coated substrate is typically heated to melt the composition and cause it to flow. In certain applications, the part to be coated may be pre-heated before the application of the powder, and then either heated after the application of the powder or not. Gas or electrical furnaces are commonly used for various heating steps, but other methods (e.g., microwave) are also known. Curing (i.e., cross-linking) of the coating may be a carried out by thermal or photochemical methods (e.g., ultraviolet radiation, infrared radiation, etc.). Curing may be effected by heat conduction, convection, radiation or any combination thereof.

The powder coating compositions of this invention contain spheroidal particles. The term "spheroidal" as used herein means generally spherical in shape. More specifically, the term means filler materials that contain less than 25% particle agglomerates or fractured particles containing sharp or rough edges. The spheroidal particles should be non-reactive or inert so as not to interfere with the other properties of the composition. Examples of suitable spheroidal particles are glass microspheres, ceramic microspheres, naturally-occurring or synthetic spheroidal minerals such as cristobalite, polymer microspheres and metal microspheres.

As already mentioned, the spheroid particles must have a mean particle size greater than 10 microns, preferably of greater than 15 microns. Intermediate ranges are included. As the mean particle diameter decreases, the surface per unit weight increases. The increase in surface area results in a tendency of the filler to dry the coating, reduce flow, and induce roughness in the coating. As indicated in the working examples, spheroidal particles having a mean diameter of 10 microns or below produced only marginal results in gloss control, whereas at mean diameters greater than 10, particularly of greater than 15, the spheroidal particles gave good results.

The upper limit of the diameter of the spheroidal particles is dependent on the intended thickness of the final coating in that the particles must have a diameter less than the coating thickness. Most powder coatings, especially "decorative" powder coatings, are designed to be applied at a dry film thickness of about 50 microns. Thus, in most applications, the spheroidal particles should have a maximum diameter of less than about 50 microns, preferably 40 microns.

The spheroidal particles may be present in the composition in an amount of from 5 wt % to 60 wt %, based on the total weight of the powder coating composition. Below 5 wt %, little effect on gloss is observed. Above 60 wt %, an unacceptable loss of coating flow results. It is understood that these are general guidelines and the exact weight % of spheroidal particles will depend on the specific gravity of the spheroidal particles, the degree of gloss reduction desired and the other components of the powder coating composition.

In addition to the resins and spheroidal particles, the powder coating compositions of this invention may contain other additives that are conventionally used in powder coating compositions. Examples of such additives include fillers, extenders, flow additives, catalysts, hardeners and pigments. Compounds having anti-microbial activity may also be added as is taught in U.S. Pat. No. 6,093,407, the entire disclosure of which is incorporated herein by reference.

The powder coatings of this invention are prepared by conventional manufacturing techniques used in the powder coating industry. For example, the ingredients used in the powder coating, including the spheroidal particles, can be blended together and heated to a temperature to melt the mixture and then extruded. The extruded material is then cooled on chill rolls, broken up and then ground to a fine powder.

The spheroidal particles may also be combined with the coating powder after it is formed in a process known as "bonding." In this process, the coating powder and the material to be "bonded" with it are blended and subjected to heating and impact fusion to join the differing particles.

EXAMPLES

Table 1 identifies a number of commercially available spheroidal particles and characterizes their usefulness as gloss control agents in powder coating compositions.

TABLE 1

SPHEROIDAL GLOSS CONTROL AGENTS

| GRADE | MAX. DIA. ($\mu$M) | MEDIAN DIA. ($\mu$M) | GLOSS REDUCTION |
|---|---|---|---|
| Glass Microspheres (Potters Industries, Inc, Valley Forge, PA) | | | |
| Spheriglass ™ 3000E | 90% ≤ 60 $\mu$m | 35 | High[1] |
| Spheriglass ™ 3000E screened at 45 $\mu$m | 45 | 23 | High |
| Spheriglass ™ 10000E | 6 | 3 | Low (too fine) |

TABLE 1-continued

SPHEROIDAL GLOSS CONTROL AGENTS

| GRADE | MAX. DIA. ($\mu$M) | MEDIAN DIA. ($\mu$M) | GLOSS REDUCTION |
|---|---|---|---|
| Ceramic Microspheres (3M Corporation, Minneapolis, MN) | | | |
| G200 Zeeospheres ™ | 12 | 4 | Low (too fine) |
| G400 Zeeospheres ™ | 24 | 5 | Low (too fine) |
| G600 Zeeospheres ™ | 40 | 6 | Low (too fine) |
| W610 Zeeospheres ™ | 40 | 10 | Marginal (too fine) |
| G800 Zeeospheres ™ | 200 | 18 | High[1] |
| G850 Zeeospheres ™ | 200 | 40 | High[1] |
| G850 Zeeospheres ™ screened at 45 $\mu$m | 45 | 20 | High |
| Cristobalite (C.E.D. Process Minerals, Inc., Akron, OH) | | | |
| Goresil ™ C-400 | 100 | 9 | Low (too fine)[1] |
| Goresil ™ 1045 | 45 | 10 | Marginal (too fine) |
| Goresil ™ 835 | 35 | 8 | Low (too fine) |
| Goresil ™ 525 | 25 | 5 | Low (too fine) |
| Goresil ™ 215 | 15 | 2 | Low (too fine) |

Notes:
[1]Useful only for coatings of thickness greater than about 50 microns.

Examples 1–8

The following examples illustrate the importance of the proper filler particle size on gloss control and coating smoothness. The spheroidal fillers listed in Table 3 were tested in the composition listed below in Table 2:

TABLE 2

TGIC-CURED POLYESTER COMPOSITION

| Component | Parts by weight |
|---|---|
| Crylcoat 2988 Polyester Resin (UCB) | 100 |
| Araldite PT-810 Curing Agent (Vantico) | 7.5 |
| Modaflow III Flow Aid (Solutia) | 1.3 |
| Benzoin Degassing Aid (Estron) | 0.5 |
| R-960 TiO$_2$ Pigment (DuPont) | 8.1 |
| Raven 450 Pigment (Columbia) | 0.65 |
| Spheroidal Particle | See Tables 3 and 4 |

Powder coating compositions were prepared by combining and bag-blending the components, followed by melt-extrusion. Extrudate was solidified between chilled rolls, then broken up and ground to powder. Powders were scalped at 80 mesh (180 microns) to remove coarse particles.

Coatings were prepared by applying the powdered compositions to 0.032 inch (0.081 cm) thick grounded steel panels using an electrostatic spray gun, then by baking the powder-coated panels for 10 minutes at 400° F. (204° C.). The thickness of the powder coatings was approximately 50 microns.

After cooling, the coatings were evaluated for gloss and smoothness. These results appear in Table 3.

TABLE 3

COATING COMPOSITIONS

| Spheroidal Particle | Examples | | | | | | | |
|---|---|---|---|---|---|---|---|---|
| | 1 | 2 | 3 | 4 | 5 | 6 | 7 | 8 |
| Screened[1] Spheriglass ™ 3000E (phr[2]) | — | 20 | 40 | 60 | — | — | — | — |
| G-400 Zeeospheres ™ (phr) | — | — | — | — | 20 | 40 | 60 | — |
| Screened[1] G-850 Zeeospheres ™ (phr) | — | — | — | — | — | — | — | 60 |
| Properties | | | | | | | | |
| Gloss | 102 | 74 | 50 | 38 | 75 | 68 | 60 | 35 |
| PCI Smoothness[3] | 6 | 7 | 7 | 7 | 7 | 6 | 6 | 7 |
| Inclined Plate Flow (mm) at 300° F. (149° C.) | 82 | 75 | 67 | 55 | 68 | 54 | 43 | 48 |
| Pencil Hardness[4] | H | H | H | H | H | H | H | H |
| MEK Resistance[5] | 5 | 5 | 5 | 5 | 5 | 5 | 5 | 5 |
| Direct Impact Resistance[6] | 60 | 80 | 80 | 80 | — | — | — | 80 |

Notes:
[1]Particles were screened to remove particles larger than 45 μm.
[2]phr means parts per hundred parts resin.
[3]PCI Smoothness: By comparison to standards from 1 (heavy orange peel) to 10 (smooth).
[4]In order of increasing hardness: 2B, B, HB, H, 2H, 3H etc.
[5]Rub-off noted upon 50 double rubs with a methyl ethyl ketone-saturated cotton swab, from 1 (rub through) to 5 (no effect).
[6]Inch-lb impact which did not result in cracking using a ½" hemispherical tup.

Discussion of Results

Example 1. This example (Control) shows the high gloss of an unmodified coating.

Examples 2 and 5. Each of these examples contained 20 phr (14.5 wt %) of spheroidal particles, but of different sizes. In both instances, gloss was reduced to about the same level (74 vs. 75). However, the loss of flow in example 5 was significantly higher than in example 2, which is attributed to the fact that the spheroidal particles in example 5 had a median diameter of 5 μm, which is at the lowest end of the acceptable range.

Examples 3 and 6. Each of these examples contained 40 phr (25.3 wt %) of spheroidal particles, but of different sizes. The spheroidal particles in example 3 were more effective at reducing gloss (50 vs. 68) and also had less of a negative effect on flow (67 vs. 54 mm). These results are attributed to the fact that the spheroidal particles used in example 6 had a median diameter of 5 μm, which is below the acceptable range.

Examples 4, 7 and 8 The spheroidal particles in each of these examples comprised 60 phr (33.7 wt %) of the composition. The spheroidal particles in examples 4 and 8 were about equally effective in gloss reduction (38 and 35, respectively) and were much better than the particles used in example 7 (60). The data also show that the glass particles had less of an negative impact on flow versus the ceramic particles of approximately equal size (example 4 vs. example 8). A comparison of examples 7 and 8 demonstrates again that finer particles have a greater effect on flow reduction.

Pencil Hardness

Comparison of Examples 2–7 with Example 1 (control) showed that the addition of the spheroidal particles does not reduce pencil hardness, a measure of mar resistance.

MEK Resistance

Comparison of Examples 2–7 with Example 1 (control) showed that the addition of the spheroidal particles dosnot reduce MEK resistance.

Impact Resistance

Comparison of Examples 2–4 and 8 with Example 1 (control) showed that the addition of the spheroidal particles has no negative effect on impact resistance.

Examples 9–13

Coatings were prepared, coated and evaluated as in the above examples using the spheroidal particles identified in Table 4.

TABLE 4

COATING COMPOSITIONS

| Spheroidal Particles | Example | | | | | |
|---|---|---|---|---|---|---|
| | 1 | 9 | 10 | 11 | 12 | 13 |
| Goresil ™ 215 (phr) | — | 60 | — | — | — | — |
| Goresil ™ 525 (phr) | — | — | 60 | — | — | — |
| Goresil ™ 835 (phr) | — | — | — | 60 | — | — |
| Goresil ™ 1045 (phr) | — | — | — | — | 60 | — |
| Goresil ™ C-400 (phr) | — | — | — | — | — | 60 |
| Properties | | | | | | |
| Max. Particle Size (μm) | N/A | 15 | 25 | 35 | 45 | 100 |
| Median Particle Size (μm) | N/A | 2 | 5 | 8 | 10 | 9 |
| Gloss | 96 | 66 | 59 | 52 | 42 | 43 |
| Inclined Plate Flow (mm) at 375° F. (149° C.) | 91 | 21 | 25 | 29 | 32 | 31 |
| Smoothness | 6 | 1 | 1 | 2 | 3 | 1[1] |

Notes:
[1]This coating exhibited "seeds" due to filler particles greater than the thickness of the coating layer.

Discussion of Results

Example 1 This example showed the high gloss of an unmodified control coating.

Gloss and Median Particle Size—Examples 9 through 12 As the median particle size increased from 2 to 10, the particles became more effective at reducing gloss. Gloss fells from 66 at 2 microns to 42 at 10 microns.

Flow and Median Particle Size—Examples 9 through 12 As the median particle size increased from 2 to 10 the particles had less effect on flow. Flow rose from 21 mm at 2 microns to 32 mm at 10 microns.

Smoothness and Median Particle Size—Examples 9 through 12 As the median particle size increased from 2 to 10 the coating became smoother. Smoothness rose from a rough 1 at 2 microns to less-rough 3 at 10 microns.

Smoothness and Maximum Particle Size—Example 13 This example showed the "seeds" which result from the presence of particles larger than the thickness of the coating (approx. 50 microns).

The conclusion from these examples is that best results with cristobalite spheroidal particles were obtained with samples which had the highest available median particle size, so long as no particles were thicker than the thickness of the coating.

Examples 14–19

These examples demonstrate that a properly-sized spherical filler can reduce the gloss of a variety of different coating types. Tables 5–8 list the components of the coatings that were prepared, along with gloss, smoothness and flow results. Results are summarized in Table 9.

TABLE 5

ANHYDRIDE-CURED EPOXY COATING COMPOSITION

| | Examples | |
|---|---|---|
| Component | 14 | 15 |
| DER 6225 Epoxy Resin (DOW) | 100 | 100 |
| Benzophenonetetracarboxylic anhydride (Jayhawk Fine Chemical) | 15 | 15 |
| Zinc neodecanoate (Shepherd Chemical) | 0.5 | 0.5 |
| R-706 TiO2 Pigment (DuPont) | 50 | 50 |
| Modaflow III (Solutia) | 1.3 | 1.3 |
| Benzoin (Estron) | 0.5 | 0.5 |
| Spheriglass ™ 3000E (PQ Corp.) screened at 45 μm | — | 60 |
| Properties | | |
| Gloss (60°) | 112 | 54 |
| Smoothness (PCI) | 8 | 7–8 |
| Inclined Plate Flow (mm) at 300° F. (149° C.) | 20 | 20 |

TABLE 6

EPOXY/POLYESTER HYBRID COATING COMPOSITION

| | Examples | |
|---|---|---|
| Component | 16 | 17 |
| Uralac P 5998 Polyester Resin (DSM) | 50 | 50 |
| DER 662U Epoxy Resin (DOW) | 50 | 50 |
| R-706 TiO2 Pigment (DuPont) | 50 | 50 |
| Modaflow III (Solutia) | 1.3 | 1.3 |
| Benzoin (Estron) | 0.5 | 0.5 |
| Spheriglass ™ 3000E (PQ Corp.) screened at 45 μm | — | 60 |
| Properties | | |
| Gloss (60°) | 105 | 39 |
| Smoothness (PCI) | 9 | 8–9 |
| Inclined Plate Flow (mm) at 300° F. (149° C.) | 88 | 34 |

TABLE 7

POLYESTER URETHANE COATING COMPOSITION

| | Examples | |
|---|---|---|
| Component | 18 | 19 |
| Rucote 102 Hybrid Polyester Resin (Ruco) | 100 | 100 |
| Alcure 4400 Blocked Isocyanate (McWhorter) | 25 | 25 |
| R-706 TiO2 Pigment (DuPont) | 50 | 50 |
| Modaflow III (Solutia) | 1.3 | 1.3 |
| Benzoin (Estron) | 0.5 | 0.5 |
| Spheriglass ™ 3000E (PQ Corp.) screened at 45 μm | — | 60 |
| Properties | | |
| Gloss (60°) | 99 | 31 |
| Smoothness (PCI) | 8 | 8 |
| Inclined Plate Flow (mm) at 300° F. (149° C.) | 95 | 77 |

TABLE 9

COATING SURVEY SUMMARY

| Chemistry | Example | Gloss | Flow | Smoothness |
|---|---|---|---|---|
| TGIC Polyester | 1 (control) | 102 | 82 | 6 |
| | 4 | 38 | 55 | 7 |
| Anhydride Epoxy | 14 (control) | 112 | 20 | 8 |
| | 15 | 54 | 20 | 7–8 |
| Hybrid | 16 (control) | 105 | 88 | 9 |
| | 17 | 39 | 34 | 8–9 |
| Urethane | 18 (control) | 99 | 95 | 8 |
| | 19 | 31 | 77 | 8 |

These data show that properly-sized spherical fillers can be reliably used to reduce gloss in a variety of powder coating chemistries.

What is claimed is:

1. A low gloss powder coating composition consisting essentially of spheroidal particles and at least one resin selected from the group consisting of thermosetting resins, thermoplastic resins, and mixtures thereof;

wherein said spheroidal particles are comprising 5 to 60 wt. % of the coating composition and have a median particle diameter greater than 10 microns and a maximum particle diameter of about 50 microns, said spheroidal particles being selected from the group consisting of glass microspheres, ceramic microspheres, spheroidal minerals, polymer microspheres and metal microspheres;

wherein said resin is selected from the group consisting of saturated polyesters, unsaturated polyesters, acrylic resins, acrylate resins, polyester-urethanes, acrylic-urethanes, epoxy, epoxy-polyester, polyester-acrylics, epoxy-acrylics, polyamides, and polyvinylchloride;

wherein said low gloss powder coating composition has a gloss value that is from 1.4 to 3.2 times less than a powder coating composition comprising 0 wt. % spheroidal particles; and further wherein said low gloss powder coating composition has flow parameters that are decreased by no more than from about 0 to 2.6 times as much as a powder coating composition comprising 0 wt. % spheroidal particles.

2. The coating composition of claim 1, wherein the spheroidal particles have a median diameter of greater than 15 microns.

3. A process for producing a low gloss powder coating composition comprising adding 5 to 60 wt. %, based on total weight of the low gloss powder coating composition, spheroidal particles having a median particle diameter greater than 10 microns and a maximum diameter of about 50 microns to a powder coating composition comprising at least one resin selected from the group consisting of thermoplastic resins, thermosetting resins, and mixtures thereof;

wherein said spheroidal particles are selected from the group consisting of glass microspheres, ceramic microspheres, spheroidal minerals, polymer microspheres and metal microspheres;

wherein said resin is selected from the group consisting of saturated polyesters, unsaturated polyesters, acrylic resins, acrylate resins, polyester-urethanes, acrylic-urethanes, epoxy, epoxy-polyester, polyester-acrylics, epoxy-acrylics, polyamides, and polyvinylchloride;

wherein said low gloss powder coating composition has a gloss value that is from 1.4 to 3.2 times less than a powder coating composition comprising 0 wt. % spheroidal particles; and further wherein said low gloss powder coating composition has flow parameters that are decreased by no more than from about 0 to 2.6 times as much as a powder coating composition comprising 0 wt. % spheroidal particles.

4. The process of claim 3, wherein the spheroidal particles have a median diameter of greater than 10 microns.

5. The process of claim 3, wherein the spheroidal particles have a median diameter of greater than 15 microns.

* * * * *